United States Patent Office 3,307,181
Patented Feb. 28, 1967

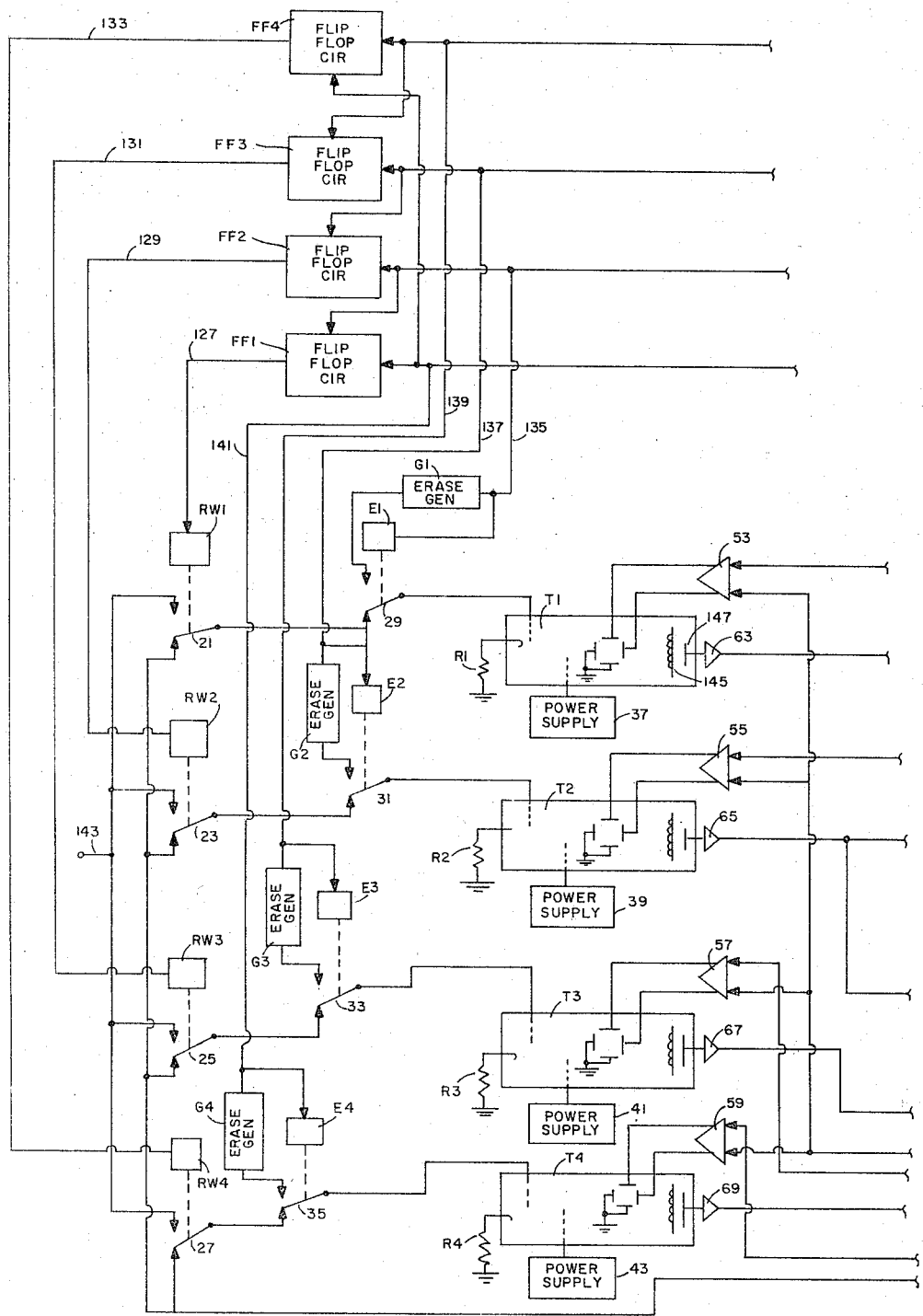

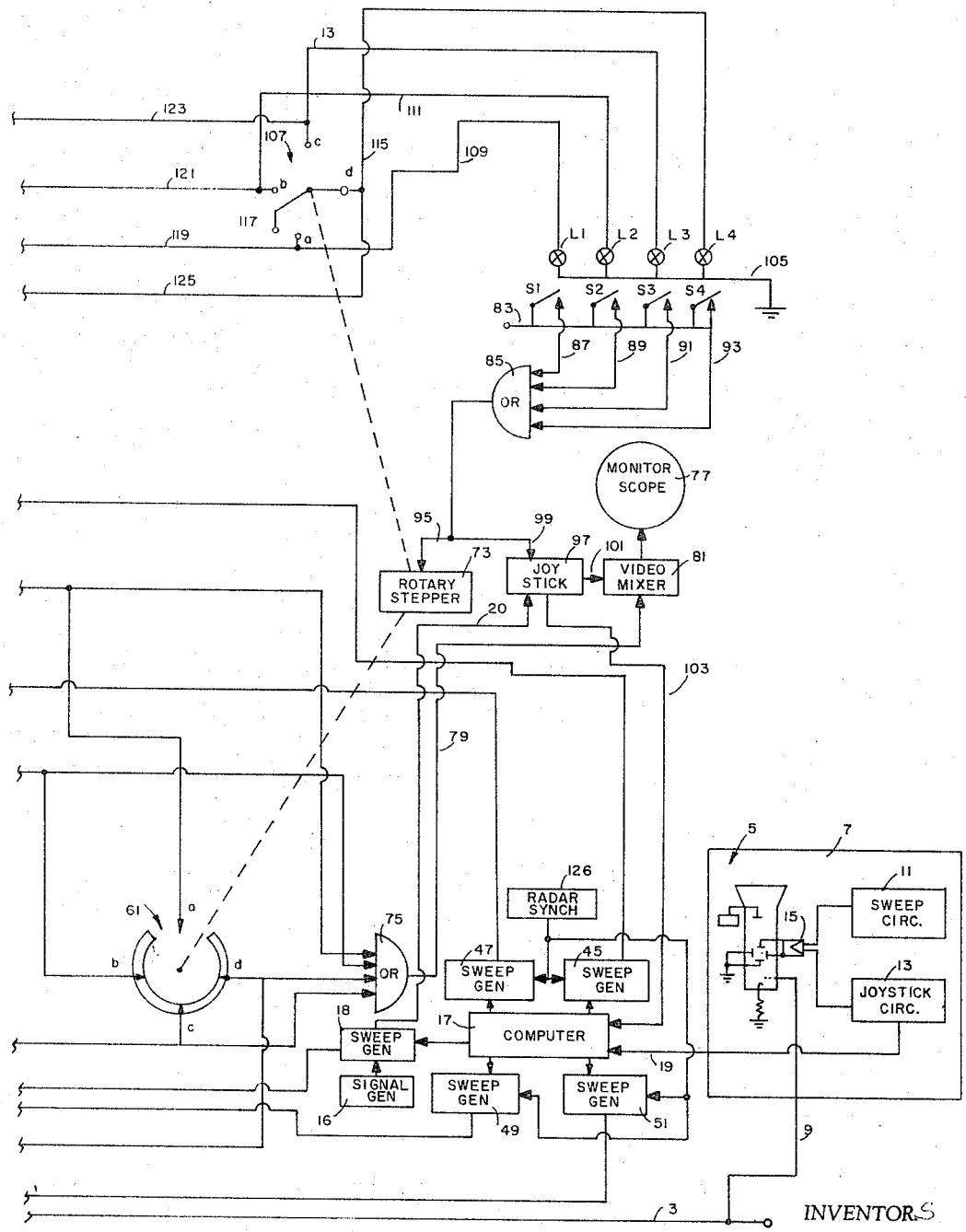

3,307,181
AUTOMATIC TARGET SEQUENCING TRACKING CONSOLE
Raymond Winfield, Wantagh, N.Y., and Donald Joseph Pizzicara, Los Angeles, Calif., assignors, by mesne assignments, to the United States of America as represented by the Secretary of the Navy
Filed Apr. 20, 1965, Ser. No. 450,274
1 Claim. (Cl. 343—11)

The present invention relates to the art of radar detection and more particularly to a novel and improved radar system of the so-called "automatic track-while-scan" type.

In conventional automatic track-while-scan radar, a preselected area of space is continuously scanned and selected targets within the area are successively presented on individual oscilloscopes for precise determination of their position through the use of a conventional joy stick device. Thus, in the prior art, an operator generally uses a plurality of oscilloscopes for presentation of an equal number of assigned targets at irregular intervals without knowing which scope will display the next target.

It is therefore a principal object of the present invention to provide novel and improved track-while-scan radar apparatus which employs only one tracking oscilloscope on which all targets appear sequentially as non-fading, TV pictures.

It is a further object of the present invention to provide novel and improved track-while-scan radar apparatus in which a target is automatically presented on the oscilloscope only upon completion of the manual joy stick measurement by the operator on the preceding target.

Other objects and many of the attendant advantages of this invention will be readily appreciated as the same becomes better understood by reference to the following detailed description when considered in connection with the accompanying drawing wherein:

The single figure of the drawing is a diagrammatic view of a preferred embodiment of the invention.

As shown in FIGURES 1A and 1B of the drawings, the incoming video signals on conductor 3 are coupled to the grid of the scope 5 of control console 7 through conductor 9. The sweep circuit 11 for the scope 5 and the joy stick circuit 13 are coupled to the deflection plates of the scope through the summing amplifier 15. The joy stick circuit 13 is also coupled to the computer 17 through conductor 19.

The incoming video signal on conductor 3 is also coupled to the control grids of storage tubes T–1, T–2, T–3 and T–4 respectively through the deenergized armatures 21, 23, 25 and 27 of relays RW–1, RW–2, RW–3 and RW–4 and through the deenergized armatures 29, 31, 33 and 35 of relays E–1, E–2, E–3 and E–4. The cathodes of storage tubes T–1—T–4 are returned to ground in any suitable manner such as is shown through resistors R–1, R–2, R–3 and R–4. The anodes of storage tubes T–1—T–4 are respectively coupled as shown to the high voltage power supply circuits 37, 39, 41 and 43. The computer 17 is coupled to the deflection plates of storage tubes T–1—T–4 respectively through the PPI sweep generators 45, 47, 49 and 51 and the deflection amplifiers 53, 55, 57 and 59. The computer 17 and the TV signal generator 16 are connected to the TV sweep generator 18 which is also coupled to the deflection plates of storage tubes T–1—T–4 respectively through deflection amplifiers 53, 55, 57 and 59. TV sweep generator 18 is also coupled to the joy stick 97 through conductor 20. The signal electrodes of storage tubes T–1—T–4 are respectively coupled to contacts a–d of rotary switch 61 through amplifiers 63, 65, 67 and 69. The segmented annulus of switch 61 is electrically connected to ground as shown and is mechanically coupled to the rotary stepping mechanism 73 which controls its angular disposition in a manner which will be more apparent hereinafter. The signal electrodes of storage tubes T–1—T–4 are also coupled to the "OR" circuit 75 respectively through amplifiers 63, 65, 67 and 69. The output circuit of "OR" circuit 75 is coupled to the control grid of the monitor scope 77 through conductor 79 and video mixer 81.

The low voltage power supply line 83 is coupled as shown to the "OR" circuit 85 through switches S–1, S–2, S–3 and S–4 and conductors 87, 89, 91 and 93. The output circuit of "OR" circuit 85 is coupled to the rotary stepping mechanism 73 through conductor 95 and to joy stick circuit 97 through conductor 99. Joy stick circuit 97 is in turn coupled to video mixer 81 through conductor 101 and to the computer 17 through conductor 103.

Switches S–1, S–2, S–3 and S–4 are preferably disposed in a line beneath lamps L–1, L–2, L–3 and L–4 as shown adjacent the monitor scope 77. One terminal of each of the lamps is connected to ground through conductor 105. The other terminals of lamps L–1—L–4 are respectively coupled to contacts a–d of rotary switch 107 through conductors 109, 111, 113 and 115. The rotary armature of switch 107 is electrically connected to the low voltage power supply line 117 and is mechanically coupled to the rotary stepping mechanism 73. Contacts a–d of switch 107 are also respectively coupled to flip-flop circuits FF–1, FF–2, FF–3 and FF–4 through conductors 119, 121, 123 and 125. The output circuits of flip-flop circuits FF–1—FF–4 are in turn respectively coupled to the read-writer relays RW–1, RW–2, RW–3 and RW–4 through conductors 127, 129, 131 and 133. Contacts a–d of switch 107 are also respectively coupled to the erase control relays E–1, E–2, E–3 and E–4 and erase generator circuits G–1, G–2, G–3 and G–4 through conductors 135, 137, 139 and 141. The output circuits of erase circuits G–1—G–4 are respectively coupled to the control grids of storage tubes T–1—T–4 through the energized armatures 29, 31, 33 and 35 of relays E–1, E–2, E–3 and E–4.

Inasmuch as the specific design of the computer of itself forms no part of the present invention, details of its structure and circuitry are not provided herein for the sake of simplicity. For a full understanding of the present invention, it need only be understood that the computer is of any suitable conventional design that will store initial and accumulated error entries, predict from them expected positions of the various targets assigned to the storage tubes, and feed offset position data to the PPI sweep generators 45, 47, 49 and 51, which are synchronized by the radar synchronizer 126, to maintain moving targets at the storage screen center or alternatively switch in TV sweep generator 18 synchronized by television synchronizer 16 to read out the stored PPI storage tube data.

In operation, the video target signals on conductor 3 are coupled to the control grid of the PPI scope of the central control console 7. The control console operator observes the PPI presentation provided by the sweep circuit 11 on scope 5 and controls the joy stick in circuit 13 so as to position a hook marker symbol over a selected target. When this is done, the operator depresses a switch in the joy stick circuit 13 which transmits the instantaneous joy stick X–Y coordinate potentials to the computer 17 through conductor 19. Assuming that storage tube T–1 is available for assignment of the selected target, the joy stick coordinate potentials energize PPI sweep generator 45 periodically in predetermined synchronism with the search antenna of the radar system. Generator 45 then develops horizontal and vertical sweeps that define a localized offset area in space in which the selected target is located. The horizontal and vertical sweeps produced by offset generator 45 are then applied to the deflection plates of storage tube T–1 through deflection amplifier 53.

When the armature 21 of relay RW-1 occupies its normally deenergized position, video target signals on conductor 3 are simultaneously coupled to the control grid of storage tube T-1. In this way, the position of the selected target in its localized offset area in space is written and stored on the storage screen of storage tube T-1. The disposition of other targets are similarly recorded and stored in tubes T-2, T-3 and T-4.

When the armature of rotary switch 107 occupies a position in which it engages contact *d* and the segmented annulus of switch 61 grounds all contacts except contact *a*, the potential on conductor 117 energizes the flip-flop circuit FF-1 through conductor 125. Flip-flop circuit FF-1 is operated to its "read" condition and an output potential is provided on conductor 127 that energizes relay RW-1. Energization of relay RW-1 then couples the "read" potential on conductor 143 to the control grid of storage tube T-1. Insulated charges stored on the storage screen 145 of tube T-1 during the above described "write in" operation create electrostatic fields which control the intensity of the electron beam that passes through to the signal electrode 147 of tube T-1 as the computer controlled TV scanning operation on the deflection plates of tube T-1 proceeds. The flow of electrons from the signal electrode of tube T-1 is then amplified in amplifier 63 and coupled to the control grid of the monitor scope 77 through "OR" circuit 75, conductor 79, and the video mixer 81. In this way, a continuous non-fading TV picture of the target assigned to tube T-1 is placed on the screen of the tracking monitor scope 77.

In the meantime, it will be noted relays RW-2, RW-3 and RW-4 remain in their normally deenergized condition and the dispositions of the assigned targets of tubes T-2, T-3 and T-4 are continuously rewritten and stored on their respective storage screens.

The operator at the monitor scope 77 then controls the joy stick in circuit 97 so as to position the leading edge of the hook marker developed by the joy stick circuit 97 at the center of the displayed target. When this is done, the monitor operator depresses the switch S-1 beneath the lamp L-1, which identifies the channel in which the displayed target is stored. The joy stick circuit 97 is then energized through the circuit which includes conductor 83, switch S-1, conductor 87, the "OR" circuit 85 and conductor 99, as well as by the TV sweep wave forms from generator 18. The X-Y joy stick coordinates defining the marker leading edge are then transmitted to the computer 17 through conductor 103. On the basis of the initial and the subsequent target position entries recorded and stored in the computer in this way, the position of the assigned target is continuously predicted for proper periodic off-setting of the PPI sweep generator 45.

Operation of switch S-1 simultaneously energizes the rotary stepping mechanism 73 through conductor 87, "OR" circuit 85 and conductor 95. The mechanism 73 is therefore advanced one step and the armature of switch 107 engages contact *a*. When this occurs, the erase relay E-1 and erasure generator G-1 are energized through the circuit that extends from power supply line 117 through armature of switch 107 and conductors 119 and 135. The output circuit of the erase generator G-1 then establishes the control grid of storage tube T-1 at a predetermined potential at which the entire surface of the storage screen 145 is bombarded by the electron beam so as to remove charges previously stored thereon.

When the armature of switch 107 engages contact *a*, the flip-flop circuit FF-2 is simultaneously energized and operated to its "read" condition. This provides an output potential on conductor 129 that energizes relay RW-2 and couples the "read" potential on conductor 143 to the control grid of tube T-2. Tube T-2 is then read as the TV sweep generator 18 scans the storage screen of the tube T-2 and the TV readout signals are transferred to the screen of monitor scope 77 through amplifier 65, "OR" circuit 75, conductor 79 and video mixer 81. The process of hooking a target, transferring the joy stick potentials to computer 17, energizing the rotary stepping mechanism 73 and switches 61 and 107, erasing the data stored in one tube and reading the next tube for presentation on the monitor is then repeated in a similar manner for the targets recorded and stored on tubes T-3 and T-4. The targets assigned to the four storage tubes are then continuously tracked in a regular mode of succession in a similar manner until further tracking of the same is no longer of interest.

Obviously, many modifications and variations of the present invention are possible in the light of the above teachings. It is therefore to be understood that within the scope of the appended claim, the invention may be practiced otherwise than as specifically described.

What is claimed is:

Apparatus for sequentially monitoring a plurality of radar target signals, said apparatus comprising:
 (a) a plurality of storage tubes;
 (b) means for normally coupling incoming radar target signals to the control grid of each of the storage tubes;
 (c) a horizontal and vertical sweep generator which is coupled to the deflection plates of each storage tube and which produces a raster on each tube that represents the area in which a plurality of radar targets are located;
 (d) a monitor oscilloscope;
 (e) a first rotary stepping switch which sequentially couples the output circuits of the storage tubes to the monitor oscilloscope;
 (f) joy stick apparatus which is coupled to the monitor oscilloscope and which develops a pair of variable potentials that define the rectangular coordinate position of the target on the monitor oscilloscope;
 (g) a relay for each storage tube;
 (h) a second rotary stepping switch which sequentially energizes the relays for the storage tubes and sequentially provides a reading potential on the control grids of the storage tubes, the second rotary switch also simultaneously sequentially providing an erasing potential on the control grids of the previously read tubes;
 (i) and a rotary stepping mechanism which actuates the first and second stepping switches and which is manually energized when the variable potentials of the joy stick apparatus define the rectangular coordinate position of the target on the monitor oscilloscope.

References Cited by the Examiner
UNITED STATES PATENTS
2,944,253  7/1960  Covely et al. _____ 343—11 X CHESTER L. JUSTUS, *Primary Examiner.*

T. H. TUBBESING, *Assistant Examiner.*